US010999173B2

(12) United States Patent
Zacks et al.

(10) Patent No.: US 10,999,173 B2
(45) Date of Patent: May 4, 2021

(54) ACTIVE TARGETED DATA PLANE TRAFFIC MONITORING FOR WIRED NETWORKS

(71) Applicant: Cisco Technology, Inc., San Jose, CA (US)

(72) Inventors: David John Zacks, Vancouver (CA); Vikram Vikas Pendharkar, San Jose, CA (US); Peter Geoffrey Jones, Campbell, CA (US); Thomas Szigeti, Vancouver (CA); Praveen T. Chandra, Saratoga, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 53 days.

(21) Appl. No.: 16/390,695

(22) Filed: Apr. 22, 2019

(65) Prior Publication Data

US 2020/0162357 A1 May 21, 2020

Related U.S. Application Data

(60) Provisional application No. 62/769,290, filed on Nov. 19, 2018.

(51) Int. Cl.
*H04L 12/26* (2006.01)
*H04L 12/801* (2013.01)
(Continued)

(52) U.S. Cl.
CPC ........ *H04L 43/0876* (2013.01); *H04L 43/087* (2013.01); *H04L 43/0829* (2013.01); *H04L 47/34* (2013.01); *H04L 69/22* (2013.01)

(58) Field of Classification Search
CPC ............. H04L 43/0829; H04L 43/0876; H04L 43/087; H04L 43/028; H04L 47/34;
(Continued)

(56) References Cited

U.S. PATENT DOCUMENTS 6,873,600 B1 *  3/2005  Duffield ................. H04L 43/50
                                                      370/252
6,920,112 B1 *  7/2005  McCloghrie .......... H04L 43/022
                                                      370/230

(Continued)

OTHER PUBLICATIONS

International Search Report and Written Opinion from the International Searching Authority, dated Mar. 17, 2020, 12 pages, for corresponding International Patent Application No. PCT/US2019/060034.

*Primary Examiner* — Maharishi V Khirodhar
*Assistant Examiner* — Kenneth P Hunt
(74) *Attorney, Agent, or Firm* — Polsinelli PC

(57) ABSTRACT

Systems, methods, and computer-readable media for monitoring traffic in a network include receiving, at an analytics platform connected to the network, one or more encapsulated packet headers from one or more network nodes of the network. From the one or more encapsulated packet headers, at least one or more source addresses of the one or more network nodes which transmitted the encapsulated packet headers, and one or more timestamps at which the one or more encapsulated packet headers were transmitted from the one or more network nodes may be determined. From at least the one or more source addresses and timestamps, network traffic information such as one or more of latency or jitter of data packets transiting through the one or more network nodes may be determined, wherein the one or more encapsulated packet headers may correspond to the data packets transiting through the one or more network nodes.

20 Claims, 7 Drawing Sheets

(51) Int. Cl.
*H01L 29/06* (2006.01)
*H04L 29/06* (2006.01)

(58) Field of Classification Search
CPC ............ H04L 69/22; H04L 43/04–045; H04L
43/02–028; H04L 43/022; H04L
43/06–067; H04L 43/062; H04L 43/065;
H04L 43/067; H04L 43/08–0894; H04L
43/0823; H04L 43/0835; H04L 43/0841;
H04L 43/0847; H04L 43/0852; H04L
43/0858; H04L 43/086; H04L 43/106;
H04L 43/14; H04L 43/18; H04L 43/00
See application file for complete search history.

(56) References Cited

U.S. PATENT DOCUMENTS

| | | | |
|---|---|---|---|
| 7,694,011 B2 | 4/2010 | O'Rourke et al. | |
| 9,088,496 B2 | 7/2015 | Vaidya et al. | |
| 9,813,340 B2 | 7/2017 | Thubert et al. | |
| 9,787,559 B1 | 10/2017 | Schroeder | |
| 2001/0039580 A1* | 11/2001 | Walker | H04L 43/026 709/224 |
| 2007/0271374 A1* | 11/2007 | Shomura | H04L 43/022 709/224 |
| 2010/0125661 A1* | 5/2010 | Perala | H04L 43/0852 709/224 |
| 2011/0110309 A1 | 5/2011 | Bennett | |
| 2011/0305149 A1* | 12/2011 | Scott | H04L 43/106 370/252 |
| 2013/0318238 A1* | 11/2013 | Hall | H04L 43/04 709/224 |
| 2016/0099853 A1 | 4/2016 | Nedeltchev et al. | |
| 2016/0344641 A1 | 11/2016 | Javidi et al. | |
| 2018/0309647 A1* | 10/2018 | Rosenberg | H04L 43/18 |
| 2019/0182143 A1* | 6/2019 | Kim | H04L 41/0806 |
| 2019/0190804 A1* | 6/2019 | Tang | H04L 43/0852 |

* cited by examiner

_US 10,999,173 B2_

ACTIVE TARGETED DATA PLANE TRAFFIC MONITORING FOR WIRED NETWORKS

CROSS-REFERENCE TO RELATED APPLICATIONS

This application claims priority of U.S. Provisional Application No. 62/769,290, filed on Nov. 19, 2018, the content of which is incorporated herein by reference in its entirety.

TECHNICAL FIELD

The subject matter of this disclosure relates in general to the field of computer networking, and more particularly to monitoring and analysis of network performance and detection of network impairments adversely affecting communication sessions.

BACKGROUND

Currently, it is very difficult, time-consuming, labor intensive, and error-prone to monitor network traffic flows at multiple locations in a wired network, and to then correlate the results to determine meaningful impact of any network impairments on actual end-user network traffic flows. An example of currently utilized methods includes generating synthetic traffic streams in a network to simulate user traffic streams. Metrics measured against these synthetic traffic streams are analyzed to measure network performance, determine packet loss or delivery rates, and detect network impairments. However, reliance on synthetic traffic streams introduces added control plane and data plane load, increased overhead, as well as additional analysis complexities. Furthermore, relying on synthetic traffic streams for monitoring the traffic flow may be deceptive, as actual or real user traffic may exhibit characteristics which are different from the characteristics of the synthetic traffic streams. Accordingly, monitoring synthetic traffic streams may provide inaccurate results.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
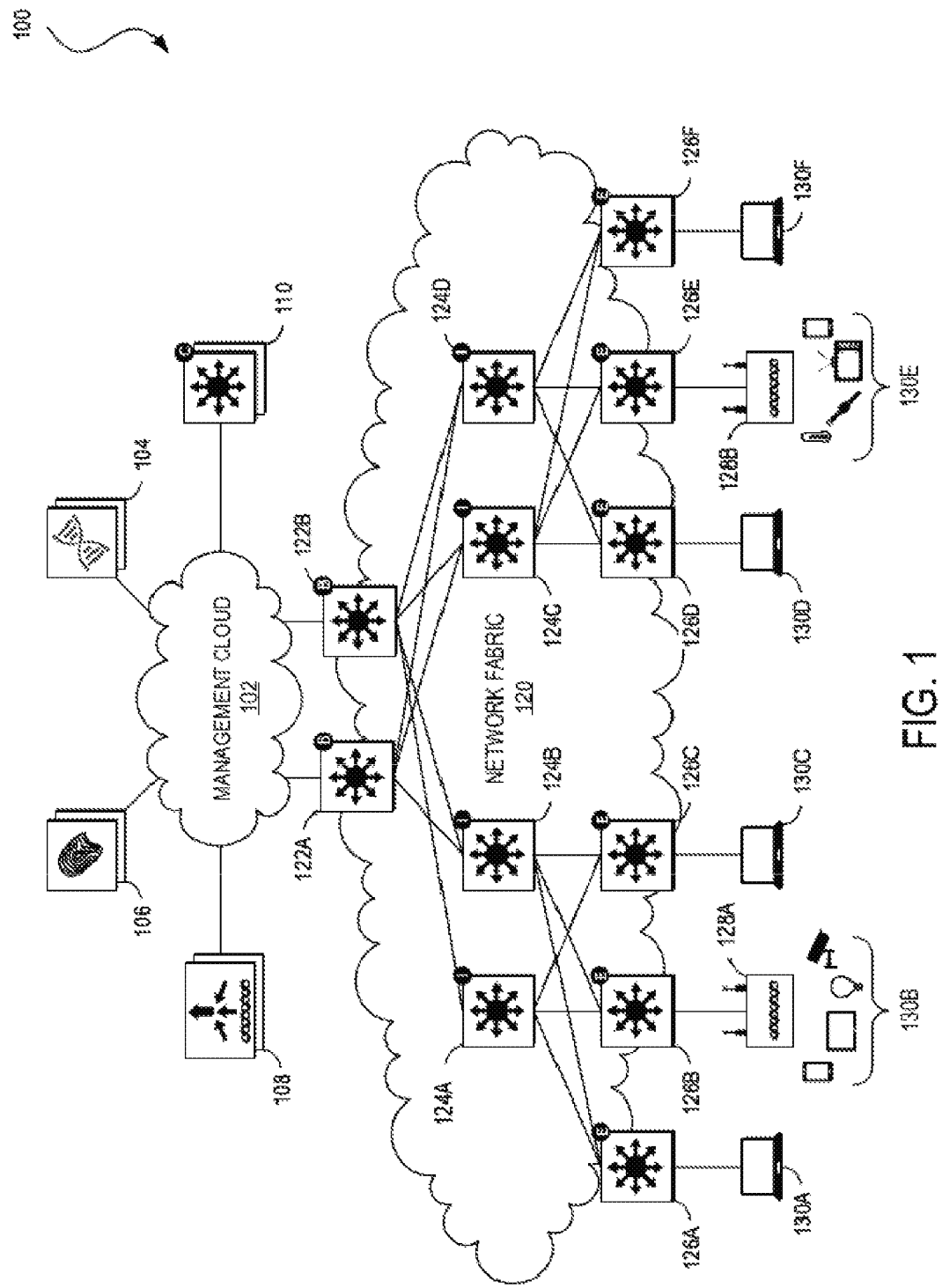
FIG. 1 illustrates an example of a physical topology of an enterprise network in accordance with some examples.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed herein are systems, methods, and computer-readable media for schemes according to which, network traffic may be monitored based on encapsulated truncated copies of packet headers received from network nodes for selected packets transiting through the network nodes. In some examples, a method of monitoring traffic in a network may involve receiving, at an analytics platform connected to the network, one or more encapsulated packet headers from one or more network nodes of the network. From the one or more encapsulated packet headers, at least one or more source addresses of the one or more network nodes which transmitted the encapsulated packet headers, and one or more timestamps at which the one or more encapsulated packet headers were transmitted from the one or more network nodes may be determined. Further, from at least the one or more source addresses and the one or more timestamps, network traffic information such as at least one or more of latency or jitter of data packets transiting through the one or more network nodes may be determined, wherein the one or more encapsulated packet headers may correspond to the data packets transiting through the one or more network nodes.

The method can also involve determining one or more sequence numbers from each of the one or more encapsulated packet headers and determining one or more of a loss in the data packets or the one or more encapsulated packet headers, based on the one or more sequence numbers. In some examples, the one or more sequence numbers comprise at least a first sequence number introduced by a first network node of the one or more network nodes, wherein the first network node is an ingress node of the network through which the data packets enter the network from an endpoint external to the network. The first sequence number incremented at each successive network node of the one or more network nodes through which the data packets transit. In some examples, the one or more sequence numbers may optionally also comprise a second sequence number, wherein the second sequence number is invariant between the first network node and the successive network nodes of the one or more network nodes through which the data packets transit.

In some cases, each encapsulated packet header of the one or more encapsulated packet headers may comprise a truncated copy of a header of a data packet transiting through a corresponding network node of the one or more network nodes. The one or more encapsulated packet headers may be received from the one or more network nodes based on one or more selection criteria provided to the one or more network nodes, wherein the encapsulated packet headers are generated by the one or more network nodes for the data packets transiting the one or more network nodes and matching the selection criteria. In some cases, the one or more selection criteria correspond to a granularity of the network traffic to be monitored.

In some cases, the one or more encapsulated packet headers are received from a first network node of the one or more network nodes based on one or more selection criteria provided to the first network node and a flag inserted by the first network node. The insertion of the flag by the first network node is optional, and where used, the encapsulated packet headers are generated by the first network nodes for the data packets transiting the first network node and matching the selection criteria. In these cases, the one or more encapsulated packet headers may be received from the one or more intermediate network nodes other than the first network node based on data packets transiting the one or more intermediate network nodes and matching the flag.

In some examples, a system is provided. The system comprises one or more processors and a non-transitory computer-readable storage medium containing instructions which, when executed on the one or more processors, cause the one or more processors to perform operations. The operations may include receiving one or more encapsulated packet headers from one or more network nodes of the network. The operations may also include determining, from the one or more encapsulated packet headers, at least one or more source addresses of the one or more network nodes which transmitted the encapsulated packet headers, and one or more timestamps at which the one or more encapsulated packet headers were transmitted from the one or more network nodes. The operations may further include determining, from at least the one or more source addresses and the one or more timestamps, at least one or more of latency or jitter of data packets transiting through the one or more network nodes, wherein the one or more encapsulated packet headers correspond to the data packets transiting through the one or more network nodes.

In some cases, the operations may further include determining one or more sequence numbers from each of the one or more encapsulated packet headers, and determining one or more of a loss in the data packets or the one or more encapsulated packet headers, based on the one or more sequence numbers. In some examples, the one or more sequence numbers comprise at least a first sequence number introduced by a first network node of the one or more network nodes, wherein the first network node is an ingress node of the network through which the data packets enter the network from an endpoint external to the network. The first sequence number incremented at each successive network node of the one or more network nodes through which the data packets transit. In some examples, the one or more sequence numbers may optionally also comprise a second sequence number, wherein the second sequence number is invariant between the first network node and the successive network nodes of the one or more network nodes through which the data packets transit.

In some cases of the example system, each encapsulated packet header of the one or more encapsulated packet headers comprises a truncated copy of a header of a data packet transiting through a corresponding network node of the one or more network nodes. In these cases, the one or more encapsulated packet headers may be received from the one or more network nodes based on one or more selection criteria provided to the one or more network nodes, wherein the encapsulated packet headers are generated by the one or more network nodes for the data packets transiting the one or more network nodes and matching the selection criteria.

In some cases, the one or more encapsulated packet headers may be received from a first network node of the one or more network nodes based on one or more selection criteria provided to the first network node and a flag inserted by the first network node. The flag is optional, and where inserted by the first network node, the encapsulated packet headers are generated by the first network nodes for the data packets transiting the first network node and matching the selection criteria. In these cases, the one or more encapsulated packet headers may be received from the one or more intermediate network nodes other than the first network node based on data packets transiting the one or more intermediate network nodes and matching the flag.

In some examples, a non-transitory machine-readable storage medium is provided. The non-transitory machine-readable storage medium may include instructions configured to cause a data processing apparatus to perform operations. The operations may include receiving one or more encapsulated packet headers from one or more network nodes of the network and determining, from the one or more encapsulated packet headers, at least one or more source addresses of the one or more network nodes which transmitted the encapsulated packet headers, and one or more timestamps at which the one or more encapsulated packet headers were transmitted from the one or more network nodes. The operations may further include determining, from at least the one or more source addresses and the one or more timestamps, at least one or more of latency or jitter of data packets transiting through the one or more network nodes, wherein the one or more encapsulated packet headers correspond to the data packets transiting through the one or more network nodes.

DESCRIPTION OF EXAMPLE EMBODIMENTS

Disclosed herein are systems, methods, and computer-readable media for schemes according to which, real time and original traffic streams transmitted between source and destination nodes may be selectively chosen, headers thereof truncated, and transmitted to a network controller for network analysis, without interfering with the real time and original traffic streams being forwarded to their destinations. Some example advantages of using the real time and original traffic streams is the reduction of load in both control and data planes as well as significant reduction in complexity of performing network monitoring, performance measurement and detecting network impairments.

Conventional approaches for network traffic monitoring include internet protocol service level agreement (IP SLA) and other similar methods, which rely on generating synthetic or simulated traffic streams for a network to be monitored. The synthetic traffic streams are used to simulate user/device traffic streams and these synthetic traffic streams are driven across the network from an IP SLA source to a receiver (typically hosted on network devices such as switches and routers). By analyzing various metrics measured against these synthetic traffic streams, the quality of the intervening network transport (e.g., delay, jitter, packet loss, etc.) are determined. However, these conventional approaches suffer from various drawbacks which lead to inefficiencies, inaccuracies, and increased expenses. Some of these drawbacks are explained below.

Synthetic traffic streams introduce significant control plane load on the source network devices which generate the synthetic traffic streams and the sink/destination network devices which receive the synthetic traffic streams. Since IP SLA and similar synthetic traffic streams are created and absorbed by a network device's central processing unit or "CPU" (as they are too complex and/or variable to be generated in application specific integrated circuit or "ASIC" hardware directly), the synthetic traffic streams constitute an additional (and typically burdensome, at scale) load on the network device's control plane, which may already be tasked with many other activities. This control plane load may be further increased as the sophistication of the synthetic traffic stream increases (e.g., for simulating IP-based video traffic vs. simpler voice over IP or "VoIP"), and/or as the volume of the synthetic traffic streams is increased. Typical network device CPUs are not well-sized for this type of synthetic traffic stream sources and sinks at scale.

It is noted that the generation of synthetic traffic probes between pairs of nodes of a network for obtaining traffic information may increase exponentially in relation to the number of nodes in the network being monitored. For example, the number of probes which may be generated may be of the order of n(n−1)/2, where n represents the number of nodes in the network. This exponential increase in the synthetic traffic probes may increase the control plane load to an extent which may render synthetic traffic generation untenable in large network environments.

Further, the data plane load arising from the resulting synthetic traffic streams introduces additional complexity and expenses. While bandwidth availability may not be a significant limitation in some network situations, bandwidth limitations may be significant in some networks, such as wide area networks (WANs), remote locations, satellite links, etc. Synthetic traffic streams create additional data plane traffic load that are to be transported end-to-end between the source and sink, and are typically bi-directional. Some synthetic traffic stream loads can be substantial (e.g., simulated video traffic or file transfers), and may compete directly with buffer space and other limited resources on transit network devices with real-time or actual user/device traffic. The synthetic traffic streams may require the same packet headers, e.g., Differentiated Services Field Codepoint (DSCP) values as the actual traffic to enable sharing the same queue structures on the network, and as such, the synthetic traffic streams may compete directly for the queues and buffer structures, which may be scarce resources in some network deployments, and thus, the synthetic traffic streams lead to additional network load and congestion in the data plane as well.

Yet another drawback of the synthetic traffic streams is their inherent complexity. The synthetic traffic streams may need to be carefully planned and configured in advance of their traffic transport for both normal operating modes as well as failover modes in the network. This leads to extra burden on the network administrator to plan out and execute the customized synthetic traffic streams for specific networks and modes, leading to increased complexity.

The combination of at least the above and other drawbacks of IP SLA and similar methods impose restrictions on their deployment, even though there is a significant value in being able to monitor the network and detect out-of-profile conditions.

Example aspects of this disclosure involve monitoring techniques which are designed to overcome the above-noted obstacles of conventional techniques, while enhancing flexibility and ease of design and implementation of finely-targeted traffic tracing and analysis. Notably, the example techniques disclosed herein analyze actual traffic flow through a network and do not need the generation and use of synthetic traffic streams. Accordingly, the example monitoring techniques have minimal impact on control plane and data plane loads of the network. The example techniques are also of lower complexity and easier to deploy, e.g., in comparison to the conventional implementations utilizing synthetic traffic streams such as the IP SLA. Furthermore, the example techniques are flexible in that a subset of traffic streams may be selected for analysis and the type and granularity of the selected traffic streams may be tailored for specific use cases.

In one or more examples, techniques for selecting at least a subset of actual traffic flows in a network are disclosed. The selected traffic streams may be annotated in one or more manners described herein to enable their identification at various network nodes. For purposes of analysis of the selected traffic streams, the data therein may be truncated to reduce the bandwidth and control plane overhead. The truncated information is provided to at least one analytics platform which may be configured to perform network analysis on traffic flows from various network nodes of the network.

In an example, traffic flow is analyzed as it progresses through one or more places or network nodes across a network infrastructure, such as an enterprise network infrastructure. One or more triggers are used to select at least a subset of the traffic flowing through the network infrastructure, for instance at an entry node. The selected traffic flows or portions thereof (e.g., truncated headers, using an encapsulated packet header such as a remote switched port analyzer or "ERSPAN" such as ERSPANv3, to preserve bandwidth) are traced and captured from one or more network nodes to be analyzed. In one example, timestamps and one or more sequence numbers are added to captured packets from the selected traffic flows which are being tracked, e.g., at each network node through which the selected traffic flows are forwarded through. The captured information from the selected traffic flows are correlated and analyzed at the central analytics platform to enable an integrated presentation of the analysis, e.g., in a summarized fashion that clearly allows the network manager to determine one or more of the following: actual network traffic trajectory (which network nodes did the traffic provably go through (or proof of transit); analysis of possible network impairments such as delay between nodes or across the entire path, as well as jitter and packet loss, in a holistic, end-to-end fashion which can reveal what impairments may have occurred, and where they occurred in the network path for the traffic flows involved; and a deep analysis of packet headers for the traffic flows involved, to identify protocol-level responses to traffic impairments on the network path (useable to determine application experience for end users and devices).

FIG. 1 illustrates an example of a physical topology of an enterprise network 100 which may be configured according to aspects of this disclosure. For example, the enterprise network 100 may include a wired network whose traffic may be monitored according to example techniques herein. In one example, the enterprise network 100 may provide intent-based networking. It should be understood that, for the enterprise network 100 and any network discussed herein, there can be additional or fewer nodes, devices, links, networks, or components in similar or alternative configurations. Example embodiments with different numbers and/or types of endpoints, nodes, cloud components, servers, software components, devices, virtual or physical resources, configurations, topologies, services, appliances, or deployments are also contemplated herein. Further, the enterprise network 100 can include any number or type of resources, which can be accessed and utilized by endpoints or network devices. The illustrations and examples provided herein are for clarity and simplicity.

In this example, the enterprise network 100 includes a management cloud 102 and a network fabric 120. Although shown as an external network or cloud to the network fabric 120 in this example, the management cloud 102 may alternatively or additionally reside on the premises of an organization or in a colocation center (in addition to being hosted by a cloud provider or similar environment). The management cloud 102 can provide a central management plane for building and operating the network fabric 120. The management cloud 102 can be responsible for forwarding configuration and policy distribution, as well as device management and analytics. The management cloud 102 can comprise one or more network controller appliances 104, one or more authentication, authorization, and accounting (AAA) appliances 106, one or more wireless local area network controllers (WLCs) 108, and one or more fabric control plane nodes 110. In other embodiments, one or more elements of the management cloud 102 may be co-located with the network fabric 120.

The network controller appliance(s) 104 can function as the command and control system for one or more network fabrics, and can house automated workflows for deploying and managing the network fabric(s). The network controller appliance(s) 104 can include automation, design, policy, provisioning, and assurance capabilities, among others, as discussed further below with respect to FIG. 2. In some embodiments, one or more Cisco Digital Network Architecture (Cisco DNA™) appliances can operate as the network controller appliance(s) 104.

The AAA appliance(s) 106 can control access to computing resources, facilitate enforcement of network policies, audit usage, and provide information necessary to bill for services. The AAA appliance can interact with the network controller appliance(s) 104 and with databases and directories containing information for users, devices, things, policies, billing, and similar information to provide authentication, authorization, and accounting services. In some embodiments, the AAA appliance(s) 106 can utilize Remote Authentication Dial-In User Service (RADIUS) or Diameter to communicate with devices and applications. In some embodiments, one or more Cisco® Identity Services Engine (ISE) appliances can operate as the AAA appliance(s) 106.

The WLC(s) 108 can support fabric-enabled access points attached to the network fabric 120, handling traditional tasks associated with a WLC as well as interactions with the fabric control plane for wireless endpoint registration and roaming. In some embodiments, the network fabric 120 can implement a wireless deployment that moves data-plane termination (e.g., Virtual Extensible Local Area Network or "VXLAN") from a centralized location (e.g., with previous overlay Control and Provisioning of Wireless Access Points (CAPWAP) deployments) to an access point/fabric edge node. This can enable distributed forwarding and distributed policy application for wireless traffic while retaining the benefits of centralized provisioning and administration. In some embodiments, one or more Cisco® Wireless Controllers, Cisco® Wireless LAN, and/or other Cisco DNA™-ready wireless controllers can operate as the WLC(s) 108.

The network fabric 120 can comprise fabric border nodes 122A and 122B (collectively, 122), fabric intermediate nodes 124A-D (collectively, 124), and fabric edge nodes 126A-F (collectively, 126). Although the fabric control plane node(s) 110 are shown to be external to the network fabric 120 in this example, in other embodiments, the fabric control plane node(s) 110 may be co-located with the network fabric 120. In embodiments where the fabric control plane node(s) 110 are co-located with the network fabric 120, the fabric control plane node(s) 110 may comprise a dedicated node or set of nodes or the functionality of the fabric control node(s) 110 may be implemented by the fabric border nodes 122.

The fabric control plane node(s) 110 can serve as a central database for tracking all users, devices, and things as they attach to the network fabric 120, and as they roam around. The fabric control plane node(s) 110 can allow network infrastructure (e.g., switches, routers, WLCs, etc.) to query the database to determine the locations of users, devices, and things attached to the fabric instead of using a flood and learn mechanism. In this manner, the fabric control plane node(s) 110 can operate as a single source of truth about where every endpoint attached to the network fabric 120 is located at any point in time. In addition to tracking specific endpoints (e.g., /32 address for IPv4, /128 address for IPv6, etc.), the fabric control plane node(s) 110 can also track larger summarized routers (e.g., IP/mask). This flexibility can help in summarization across fabric sites and improve overall scalability.

The fabric border nodes 122 can connect the network fabric 120 to traditional Layer 3 networks (e.g., non-fabric networks) or to different fabric sites. The fabric border nodes 122 can also translate context (e.g., user, device, or thing mapping and identity) from one fabric site to another fabric site or to a traditional network. When the encapsulation is the same across different fabric sites, the translation of fabric context is generally mapped 1:1. The fabric border nodes 122 can also exchange reachability and policy information with fabric control plane nodes of different fabric sites. The fabric border nodes 122 also provide border functions for internal networks and external networks. Internal borders can advertise a defined set of known subnets, such as those leading to a group of branch sites or to a data center. External borders, on the other hand, can advertise unknown destinations (e.g., to the Internet similar in operation to the function of a default route).

The fabric intermediate nodes 124 can operate as pure Layer 3 forwarders that connect the fabric border nodes 122 to the fabric edge nodes 126 and provide the Layer 3 underlay for fabric overlay traffic.

The fabric edge nodes 126 can connect endpoints to the network fabric 120 and can encapsulate/decapsulate and forward traffic from these endpoints to and from the network fabric. The fabric edge nodes 126 may operate at the perimeter of the network fabric 120 and can be the first points for attachment of users, devices, and things and the implementation of policy. In some embodiments, the network fabric 120 can also include fabric extended nodes (not shown) for attaching downstream non-fabric Layer 2 network devices to the network fabric 120 and thereby extend the network fabric. For example, extended nodes can be small switches (e.g., compact switch, industrial Ethernet switch, building automation switch, etc.) which connect to the fabric edge nodes via Layer 2. Devices or things connected to the fabric extended nodes can use the fabric edge nodes 126 for communication to outside subnets.

In this example, the network fabric can represent a single fabric site deployment which can be differentiated from a multi-site fabric deployment.

In some embodiments, all subnets hosted in a fabric site can be provisioned across every fabric edge node 126 in that fabric site. For example, if the subnet 10.10.10.0/24 is provisioned in a given fabric site, this subnet may be defined across all of the fabric edge nodes 126 in that fabric site, and endpoints located in that subnet can be placed on any fabric edge node 126 in that fabric. This can simplify IP address management and allow deployment of fewer but larger subnets. In some embodiments, one or more Cisco® Catalyst switches, Cisco Nexus® switches, Cisco Meraki® MS switches, Cisco® Integrated Services Routers (ISRs), Cisco® Aggregation Services Routers (ASRs), Cisco® Enterprise Network Compute Systems (ENCS), Cisco® Cloud Service Virtual Routers (CSRvs), Cisco Integrated Services Virtual Routers (ISRvs), Cisco Meraki® MX appliances, and/or other Cisco DNA-ready™ devices can operate as the fabric nodes 122, 124, and 126.

The enterprise network 100 can also include wired endpoints 130A, 130C, 130D, and 130F and wireless endpoints 130B and 130E (collectively, 130). The wired endpoints 130A, 130C, 130D, and 130F can connect by wire to fabric edge nodes 126A, 126C, 126D, and 126F, respectively, and the wireless endpoints 130B and 130E can connect wirelessly to wireless access points 128B and 128E (collectively, 128), respectively, which in turn can connect by wire to fabric edge nodes 126B and 126E, respectively. In some embodiments, Cisco Aironet® access points, Cisco Meraki® MR access points, and/or other Cisco DNA™-ready access points can operate as the wireless access points 128.

The endpoints 130 can include general purpose computing devices (e.g., servers, workstations, desktop computers, etc.), mobile computing devices (e.g., laptops, tablets, mobile phones, etc.), wearable devices (e.g., watches, glasses or other head-mounted displays (HMDs), ear devices, etc.), and so forth. The endpoints 130 can also include Internet of Things (IoT) devices or equipment, such as agricultural equipment (e.g., livestock tracking and management systems, watering devices, unmanned aerial vehicles (UAVs), etc.); connected cars and other vehicles; smart home sensors and devices (e.g., alarm systems, security cameras, lighting, appliances, media players, HVAC equipment, utility meters, windows, automatic doors, door bells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, point of sale (POS) devices, Radio Frequency Identification (RFID) tags, etc.); smart city devices (e.g., street lamps, parking meters, waste management sensors, etc.); transportation and logistical equipment (e.g., turnstiles, rental car trackers, navigational devices, inventory monitors, etc.); and so forth.

In some embodiments, the network fabric 120 can support wired and wireless access as part of a single integrated infrastructure such that connectivity, mobility, and policy enforcement behavior are similar or the same for both wired and wireless endpoints. This can bring a unified experience for users, devices, and things that is independent of the access media.

In integrated wired and wireless deployments, control plane integration can be achieved with the WLC(s) 108 notifying the fabric control plane node(s) 110 of joins, roams, and disconnects by the wireless endpoints 130 such that the fabric control plane node(s) can have connectivity information about both wired and wireless endpoints in the network fabric 120, and can serve as the single source of truth for endpoints connected to the network fabric. For data plane integration, the WLC(s) 108 can instruct the fabric wireless access points 128 to form a VXLAN overlay tunnel to their adjacent fabric edge nodes 126. The AP VXLAN tunnel can carry segmentation and policy information to and from the fabric edge nodes 126, allowing connectivity and functionality identical or similar to that of a wired endpoint. When the wireless endpoints 130 join the network fabric 120 via the fabric wireless access points 128, the WLC(s) 108 can onboard the endpoints into the network fabric 120 and inform the fabric control plane node(s) 110 of the endpoints' Media Access Control (MAC) addresses. The WLC(s) 108 can then instruct the fabric wireless access points 128 to form VXLAN overlay tunnels to the adjacent fabric edge nodes 126. Next, the wireless endpoints 130 can obtain IP addresses for themselves via Dynamic Host Configuration Protocol (DHCP). Once that completes, the fabric edge nodes 126 can register the IP addresses of the wireless endpoint 130 to the fabric control plane node(s) 110 to form a mapping between the endpoints' MAC and IP addresses, and traffic to and from the wireless endpoints 130 can begin to flow.

Figure 2:
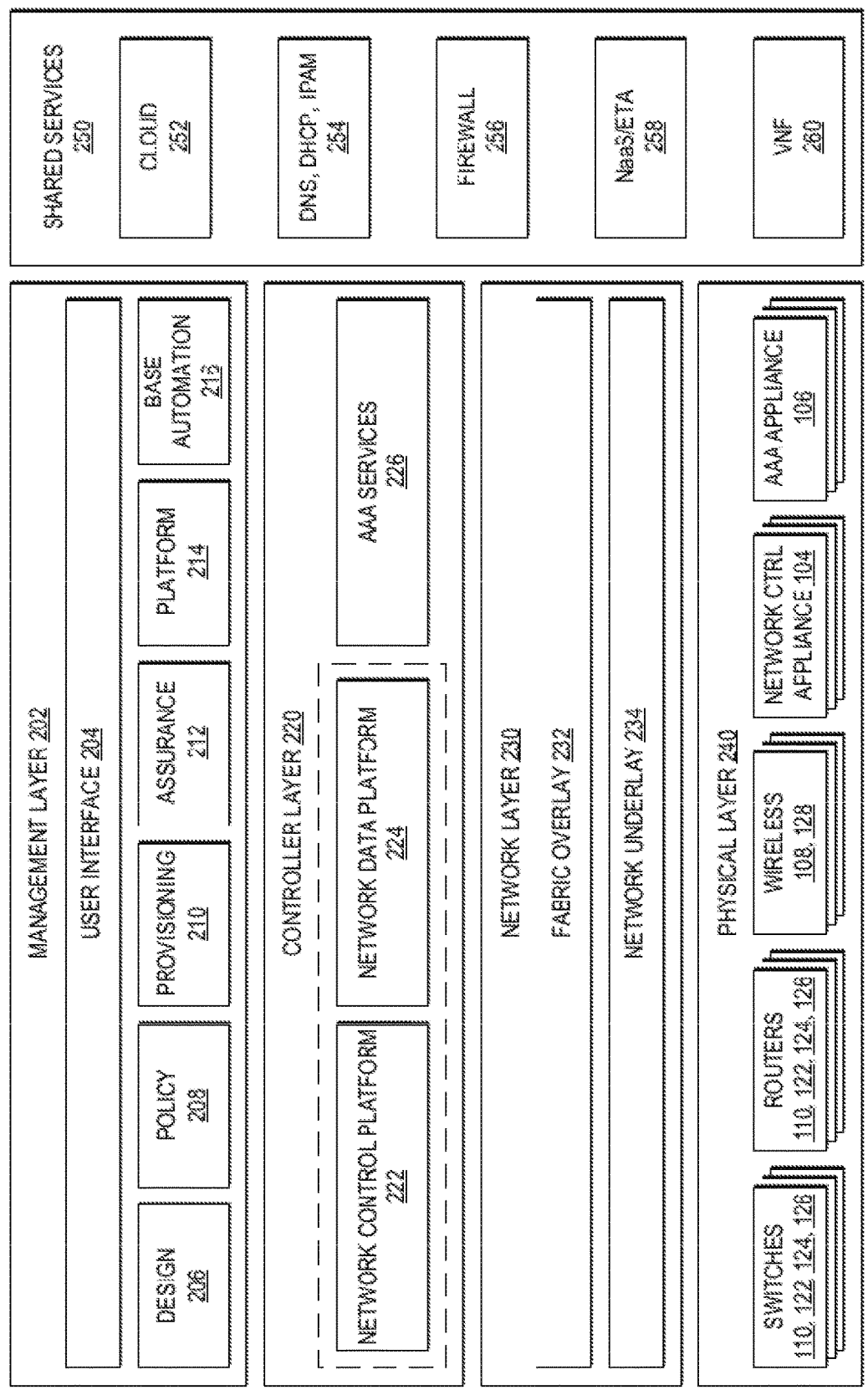
FIG. 2 illustrates an example of a logical architecture for an enterprise network in accordance with some examples.

FIG. 2 illustrates an example of a logical architecture 200 for an enterprise network (e.g., the enterprise network 100). One of ordinary skill in the art will understand that, for the logical architecture 200 and any system discussed in the present disclosure, there can be additional or fewer component in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure. In this example, the logical architecture 200 includes a management layer 202, a controller layer 220, a network layer 230 (such as embodied by the network fabric 120), a physical layer 240 (such as embodied by the various elements of FIG. 1), and a shared services layer 250.

The management layer 202 can abstract the complexities and dependencies of other layers and provide a user with tools and workflows to manage an enterprise network (e.g., the enterprise network 100). The management layer 202 can include a user interface 204, design functions 206, policy functions 208, provisioning functions 210, assurance functions 212, platform functions 214, and base automation functions 216. The user interface 204 can provide a user a single point to manage and automate the network. The user interface 204 can be implemented within a web application/web server accessible by a web browser and/or an application/application server accessible by a desktop application, a mobile app, a shell program or other command line interface (CLI), an Application Programming Interface (e.g., restful state transfer (REST), Simple Object Access Protocol (SOAP), Service Oriented Architecture (SOA), etc.), and/or other suitable interface in which the user can configure network infrastructure, devices, and things that are cloud-managed; provide user preferences; specify policies, enter data; review statistics; configure interactions or operations; and so forth. The user interface 204 may also provide visibility information, such as views of a network, network infrastructure, computing devices, and things. For example, the user interface 204 can provide a view of the status or conditions of the network, the operations taking place, services, performance, a topology or layout, protocols implemented, running processes, errors, notifications, alerts, network structure, ongoing communications, data analysis, and so forth.

The design functions 206 can include tools and workflows for managing site profiles, maps and floor plans, network settings, and IP address management, among others. The policy functions 208 can include tools and workflows for defining and managing network policies. The provisioning functions 210 can include tools and workflows for deploying the network. The assurance functions 212 can use machine learning and analytics to provide end-to-end visibility of the network by learning from the network infrastructure, endpoints, and other contextual sources of information. The platform functions 214 can include tools and workflows for integrating the network management system with other technologies. The base automation functions 216 can include tools and workflows to support the policy functions 208, the provisioning functions 210, the assurance functions 212, and the platform functions 214.

In some embodiments, the design functions 206, the policy functions 208, the provisioning functions 210, the assurance functions 212, the platform functions 214, and the base automation functions 216 can be implemented as microservices in which respective software functions are implemented in multiple containers communicating with each rather than amalgamating all tools and workflows into a single software binary. Each of the design functions 206, policy functions 208, provisioning functions 210, assurance functions 212, and platform functions 214 can be viewed as a set of related automation microservices to cover the design, policy authoring, provisioning, assurance, and cross-platform integration phases of the network lifecycle. The base automation functions 214 can support the top-level functions by allowing users to perform certain network-wide tasks.

Figure 3:
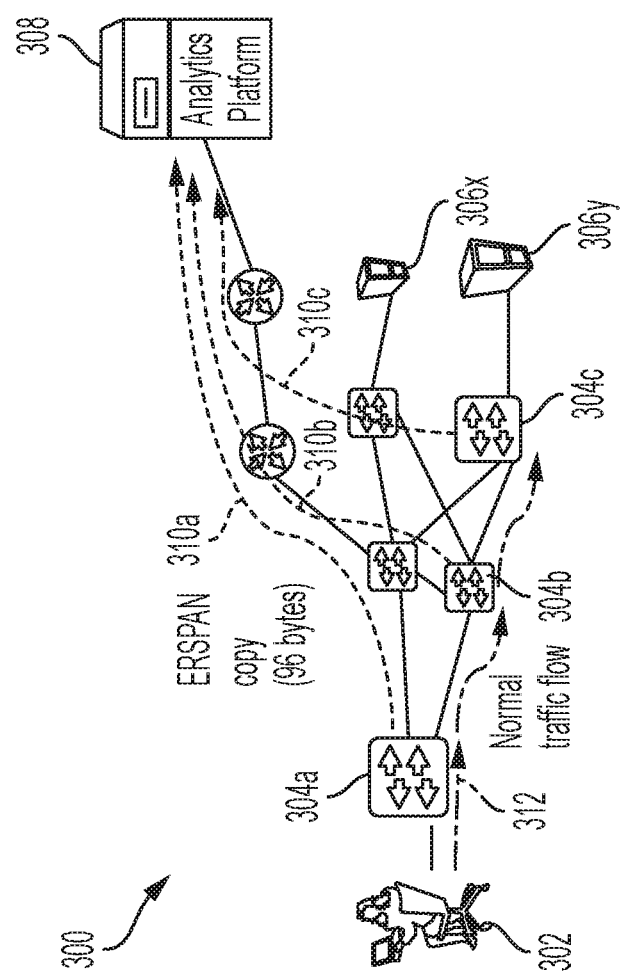
FIG. 3 illustrates an example network fabric and analytics platform for monitoring traffic in the network in accordance with some examples.

FIG. 3 illustrates an example physical topology of a network 300 configured to implement aspects of this disclosure. The network 300 may be an enterprise network whose traffic may be monitored in an efficient, cost-effective, and scalable manner. In some aspects, the network 300 may be include an example implementation of the enterprise network 100 of FIG. 1 whose logical architecture 200 was described with reference to FIG. 2 above.

For example, the network 300 illustrates a user device or an endpoint 302 which may be an example of the endpoints 130 of FIG. 1. Several network nodes are shown in the fabric of the network 300, of which a network node 304a connected to the endpoint 302 may be an example of an ingress node or the fabric edge nodes 126 of FIG. 1, and the network nodes 304b-c may be examples of the fabric intermediate nodes 124, the fabric border nodes 122, etc., of FIG. 1. The network nodes 304b-c may be connected to one or more network devices 306x-y, which may be examples of network devices such as one or more network controller appliances 104, one or more AAA appliances 106, one or more WLCs 108, or one or more fabric control plane nodes 110 of FIG. 1. The analytics platform 308 configured according to example aspects for monitoring the traffic of the network 300 may be implemented in one of the above-mentioned network devices, e.g., in one or more AAA appliances 106, or may be implemented in a separate network device.

In an exemplary aspect, the normal traffic flow 312 represents an example traffic originating from a source such as the endpoint 302, traversing the network nodes 304a-c, and reaching the sink such as the network device 306y. The normal traffic flow 312 may be bidirectional, even though shown in the direction from the source (the endpoint 302) to the sink (the network device 306y) for the purposes of an example illustration.

The normal traffic flow 302 may be monitored by the analytics platform 308. In some aspects, a subset of the normal traffic flow 312 may be selected for analysis by the analytics platform 308 to reduce the complexity and expenses of the analysis. Several ways of selecting the subset of the normal traffic flow 312 will be discussed in the following sections. Further, the data packets from the normal traffic flow 312 which are forwarded to the analytics platform 308 may be truncated to reduce bandwidth overhead. For example, only truncated headers using ERSPANv3 may be forwarded from multiple locations in the network 300, e.g., the network nodes 304a-c.

In some aspects, timestamps and one or more sequence numbers are associated with the captured packets from all traffic flows which are tracked, at each network node that the traffic flows are forwarded through. These timestamps and one or more sequence numbers are used by the analytics platform 308 to correlate the packets received from the various network nodes and analyze the trajectory of the normal traffic flow 312, for example. The analysis may reveal which network nodes the normal traffic flow 312 traversed, e.g., providing a Proof of Transit through these nodes. The analysis may also reveal possible network impairments, such as delay between nodes or across the entire path, as well as jitter and packet loss, in a holistic, end-to-end fashion. A deeper analysis of the packet headers may also reveal protocol-level responses to possible traffic impairments on the network path.

Referring to FIG. 3, when the normal traffic flow 312 enters the network 300, e.g., at the network node 304a from the endpoint 302, one or more triggers may be used for selecting a particular traffic flow or packets or portions thereof for monitoring. One or more such triggers according to this disclosure may be customized, e.g., defined by the network administrator, to signal that specific traffic streams which may be of interest for tracing and analysis. The trigger may comprise selection criteria which may enable flexibility in terms of the types of traffic streams of interest as well as granularities. For instance, a trigger may be used to select a specific portion of a traffic flow for a VoIP or video flow of interest (e.g., a specific 5-tuple source+5-tuple destination). In another example, the trigger may be broader to select a subnet or subnets match, a security group tag (SGT), a group of SGTs match, a match on a range of L4 port numbers, a match on an input interface or sub-interface, a virtual network identifier (VNID) or many other possible selectors. Regardless of the specific granularity or selection criteria, an appropriate trigger may implemented to determine whether a portion, e.g., one or more packets of a traffic flow at the node 304a in this example matches the selection criteria and if so, to initiate the process of monitoring the traffic flow.

Once the selected traffic is designated based on the trigger, any traffic matching this criteria, on entering the configured network node, may be forwarded as normal in addition to the specific functions performed for monitoring. For example, in some implementations, if a data packet has been selected at the network node 304a for monitoring based on the trigger being satisfied, then in addition to forwarding the packet along the normal traffic flow 312, a truncated copy of the packet's header is captured in each node the traffic flows through, e.g., nodes 304b-c, based on the same trigger.

In some aspects the network nodes 304a-c, which generate the truncated copy of the packet headers for the packets that are selected for monitoring, may also add a timestamp to the truncated copy of the packet headers, the timestamp indicative of the time at which the packet transited the corresponding network node 304a-c during the course of the normal traffic flow 312 of the packet.

Further, in some aspects, the network nodes may also add one or more sequence numbers to the truncated copy of the packet header before forwarding to the analytics platform 308. In some examples, a first sequence number may also be inserted by the originating network node. The first sequence number may be locally significant to each network node and as such, varied at each successive network node that the packet transits. For example, the first sequence number may be initiated to an initial value at the network node 304a for a packet selected to be monitored, and at each successive network node 304b-c through which the packet transits, the first sequence number may be incremented. The first sequence number may be used to determine if there was sampled traffic loss. For example, if the truncated copy of the packet headers from a particular network node, e.g., the network node 304b is not received at the analytics platform 308, for example, but the packet transited through the normal traffic flow 312 from the network node 304a to the network node 304c, this situation may be recognized by the analytics platform 308 based on having received the truncated copies of the packet header for the packet from the network nodes 304a and 304c, but the first sequence number having been incremented twice between the network nodes 304a and 304c. This would indicate that the once-incremented value of the first sequence number was not received, so there may have been a loss of the sampled traffic, i.e., the truncated copy of the packet header from the network node 304b.

Additionally and optionally, a second sequence number may also be used. This second sequence number, for example, may be inserted by the originating network node such as the network node 304a which selects the packet for monitoring based on the trigger. The second sequence number remains constant for a particular packet during its transit through the network 300 and does not change as a packet transits the subsequent network nodes 304b-c, for example. The intervening or subsequent network nodes 304b-c do not modify or change the second sequence number. The second sequence number may be employed in situations wherein an operations, administration, and maintenance (OAM) bit or similar header is used for the traffic in the data plane. If a particular expected value of the second sequence number is not received at analytics platform 308, this may be an indication that there was a packet loss of packets with the expected second sequence number. This is distinguished from the first sequence number above, which applies to situations wherein sampled traffic loss, not actual traffic loss may be detected.

At each of the network nodes 304a-c in the above example, the first sequence number, and optionally, the second sequence number may be added to the truncated copy of the packet header and encapsulated into the ERSPANv3 packet headers forwarded to the analytics platform 308. The encapsulated ERSPANv3 packet headers from the network nodes 304a-c have been identified with the reference numerals 310a-c respectively in FIG. 3. The first and second sequence numbers may be used for determining whether packets have transited through the network 300 as expected, or in the event of packet loss, determine whether non-receipt of a the truncated copy of the packet header from one of the network nodes 304a-c indicates whether the non-receipt pertains to loss of the truncated copy of the packet header but not an actual packet loss, or if there has been an actual packet loss in the normal traffic flow 312.

In exemplary aspects, the truncated copy of the packet header 310a-c is encapsulated with the timestamps and the first sequence number and the optional second sequence number at each of the corresponding network nodes 304a-c and forwarded to the analytics platform 308 for analysis. For example, the truncated copy of the packet headers 310a-c (typically, first 64-96 bytes, but in implementation will be a configurable value) may be captured (e.g., in ASIC hardware) in all of the nodes 304a-c through which the packet flows, and the truncated copy of the packet headers 310a-c encapsulated in ERSPANv3 along with the associated timestamp and sequence numbers, and then sent to a designated ERSPAN collector such as the analytics platform 308 for analysis.

Figure 4:
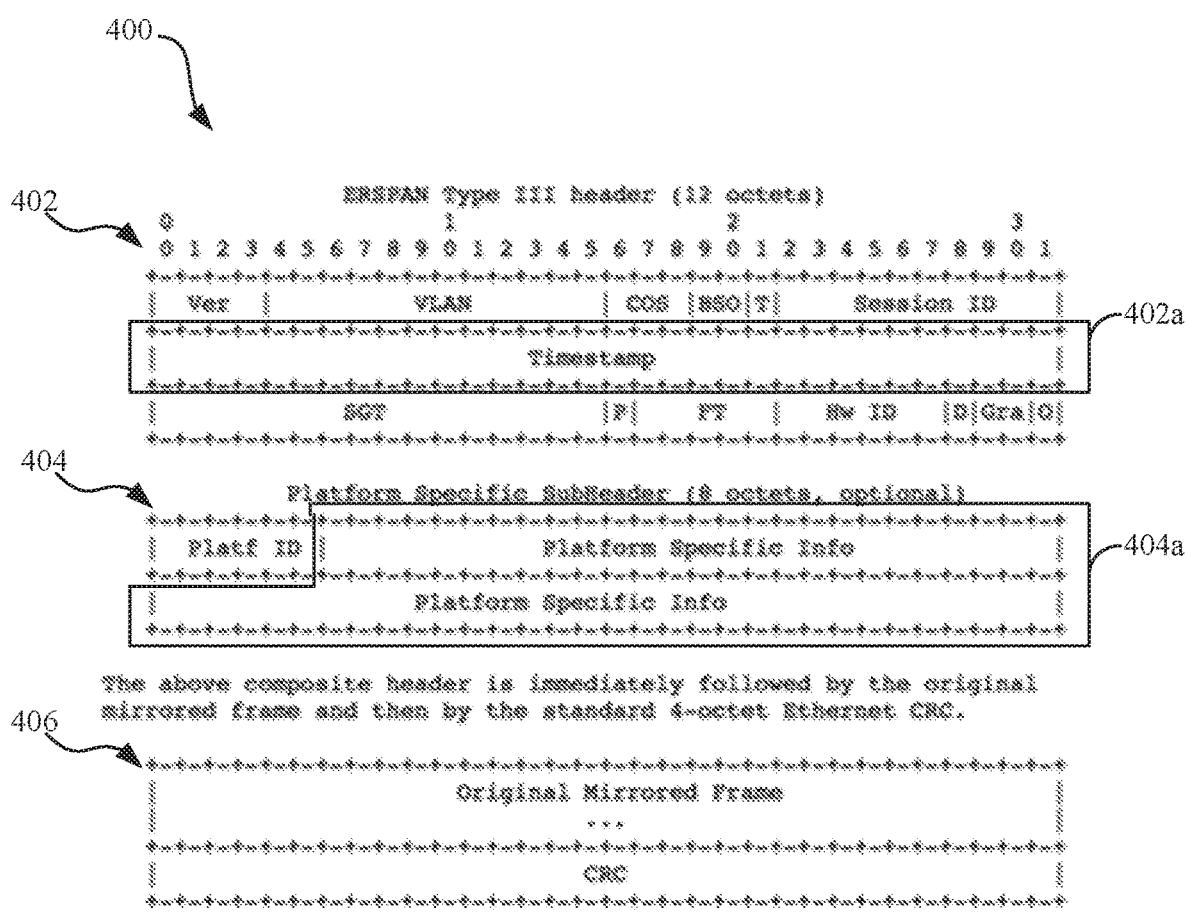
FIG. 4 illustrates an example encapsulated packet header format for providing analytics information in accordance with some examples.

Departing briefly from FIG. 3 and referring to FIG. 4, an example encapsulated packet header format is shown for one implementation in which the ERSPANv3 format may be used for the encapsulated packet headers 310a-c. The ERSPANv3 packet header illustrated in FIG. 4 is designated with the reference numeral 400. As shown, the ERSPANv3 packet header 400 may include the fields shown as the ERSPAN Type III (or ERSPANv3) header 402 (which may be 12 octets), the platform specific subheader 404 (which may be an optional 8 octet field), and wherein the above two fields of the composite header may be followed immediately by the original mirrored frame and a standard 4-octet Ethernet cyclic redundancy check (CRC) designated by the reference numeral 406.

In an implementation, the header 402 of the ERSPANv3 packet header 400 may include the timestamp in the timestamp 402a field, leveraging, for example, the ASIC-based IEEE 1588 timing capability for microsecond accuracy. The platform specific subheader 404 field may include first sequence number and the optional second sequence number in the fields 404a, which are shown as having been reserved for platform specific information.

With combined reference now to FIGS. 3-4, the truncated copy of the packet header, e.g., encapsulated as the ERSPANv3 packet header 400, may include information useful for traffic analysis, such as, source and destination addresses or IPs, ports, flags, transport control protocol (TCP) sequence numbers, etc. It is recognized that transport of the full actual packet data rather than the truncated copy of the packet header to the analytics platform may not only consume more bandwidth but may also incur privacy concerns which may not be necessary to undertake for the purposes of monitoring traffic. This is because the truncated copy of the packet header may leave out information which is sensitive to privacy, security, etc., when such information may not be useful for obtaining the desired traffic analysis. For example, the truncated copy of the packet header for the traffic flows being analyzed may include information such as the timestamp and the packet sequence number inserted by the network nodes 304a-c, which may not be specific to data contained within the packet, and as such avoid the above-noted privacy/security concerns.

Since the actual user device traffic headers from the normal traffic flow 312 is used for the analysis, the generation and absorption of synthetic traffic streams, e.g., as discussed previously for the conventional IP SLA, is avoided in example aspects. Correspondingly, the operations for implementing the exemplary traffic monitoring techniques may be performed by the network nodes 304a-c entirely in hardware, thus avoiding the control plane loading exhibited by synthetic traffic generation. In this manner, the example techniques are scalable across any number of network nodes through which a traffic flow traverses, without restrictions imposed by control plane loading concerns.

When the central point such as the analytics platform 308, receives the truncated copy of the packet headers, e.g., the ERSPAN-encapsulated truncated packet headers such as the ERSPANv3 packet header 400 discussed above, the following analysis of the traffic transport related to the selected packets may be performed.

In one aspect of the analysis, an IP address of the network nodes which sent the truncated copy of the packet headers to the analytics platform 308 may be analyzed. This IP address may correspond to a loopback address in the network nodes 304a-c for example, which may enable an efficient determination of the network nodes that the actual user/device packets transited as part of the normal traffic flow 312. This information may be correlated to a network map to show the actual (not projected) path the user traffic took, enabling a traffic trajectory examination and analysis in complex environments. In some aspects, the information regarding the network nodes that a packet transited provides a Proof of Transit for the network path used by the traffic flows involved.

Another aspect of the analysis may utilize a timestamp from the sending network node. As previously mentioned, each one of the network nodes 304a-c through which a selected packet (identified by the trigger) transits may send the truncated copy of the packet's header, encapsulated, e.g., 310a-c, to the analytics platform 308, and include in the encapsulation, the timestamp related to the time at which the packet transited the network node. By examining this timestamp and comparing it to timestamps for the same packet the analytics platform 308 may obtain useful information regarding the packet's transition through the network 300. For example, the analytics platform 308 may determine that encapsulated copies of the truncated headers from different network nodes 304a-c correspond to the same packet based on time domain adjacency of when the different encapsulated copies were received, in conjunction with the TCP sequence numbers, for example. For example, by observing the different encapsulated copies for the same packet at preceding/succeeding network nodes with synchronized clocks, the actual inter-packet delay and jitter can be calculated (noting that this calculation of the actual inter-packet delay and jitter corresponds to the actual transported user traffic in the normal traffic flow 312, rather than for a simulated or synthetic traffic stream, thus providing an inherently more accurate and representative analysis of actual user/device network experience.

Yet another aspect of the analysis pertains to determining whether a truncated copy of a packet header was captured or not at a particular network node, e.g., network node 304b in one illustrative example. As previously mentioned the analytics platform 308, the lack of a received truncated copy of the packet header from the network node 304b may not necessarily in and of itself lead to the conclusion that the actual packet of the user/device traffic being traced was dropped before arriving at the network node 304b. This is because the truncated copy of the packet header may itself have been dropped in transit from the network node 304b to the analytics platform 308, while the actual packet in the normal traffic flow 312 may have transited through the network node 304b to the network node 304c, and possibly beyond, as expected. However, if the truncated packet header from a subsequent network node 304c in the direction of the normal traffic flow 312 was received, with the same second sequence number as present in the truncated copy of the packet header from the network node 304a and a twice-incremented first sequence number, this may serve as a strong indicator of the loss being limited to that of the truncated copy of the packet header from the network node 304b (with the same second sequence number and a once-incremented first sequence number), and not a loss of the original packet itself. Conversely, the failure to capture any subsequent copies of the packet header at any downstream network node may as a strong indicator of actual user/device packet loss at the network node 304b from where the loss was observed by the analytics platform 308.

Thus, by comparing the one or more sequence numbers in the encapsulated, truncated copies of packet headers 310a-c at the analytics platform 308 in the network 300, a determination can be made as to whether the truncated copies or actual packets may have been dropped, in the event of traffic loss. Machine learning tools may be used for the above analysis and determinations of possible traffic disruptions and traffic losses.

As previously mentioned, the triggers used for selecting the packets for monitoring may be customized for different granularities. By using targeted triggers for a smaller granularity, e.g., specific packets of a traffic flow, pointed troubleshooting tasks may be performed. In other examples, a broader granularity may capture/analyze all traffic in a subnet, for example to enable a bulk traffic analysis. The following provides non-limiting example selection criteria which may be used as triggers for selecting the traffic to be monitored. The packets may be triggered by performing matches on the following non-exhaustive list of one or more of:

Source receiving interface or sub-interface (physical or virtual),
Source/destination IP address or addresses,
Source/destination L4 port number (exact match or ranges),
Source/destination subnets,
Source and/or destination SGT,
Source virtual routing domain (e.g., virtual routing and forwarding (VRF) domain/instance, virtual private network (e.g., virtual private cloud (VPC), virtual network (VN), etc.), VNID, etc.),
Source/destination MAC address (for L2 traffic flows),
Matching DSCP value, and/or
Matching protocol (TCP, UDP, GRE, etc.).

Once matched using a selection criteria such as one or more of the above non-exhaustive list of selection criteria, e.g., at the network node 304a, the traffic may be forwarded as normal on the normal traffic flow 312 as discussed above, and the encapsulated truncated copy of the packet's header (e.g., the first 64/96 bytes typically) forwarded to the analytics platform 308.

In addition to the above trigger options, an application programming interface (API)-driven dynamic trigger capability may be provided in some aspects. For example, a call control system (such as Cisco Unified Communications Manager, CUCM, or similar call control element) may be configured by the system manager of the network 300 or a voice system manager that traffic from a specific user, for example, may be targeted for capturing (e.g., based on the user having reported an issue and the customer service personnel desiring to analyze the user's traffic flow through the network 300 to assist in determining the source of the problem).

Accordingly in some aspects, further to matching traffic using the above-described example selection criteria at the first network node (e.g., the network node 304a) in the traffic entering the network (typically, the ingress switch, but alternative aspects may use other nodes designated as the first network node in the desired tracing path), the first network node may optionally set or insert a flag in the transported traffic stream. The flag may indicate to the other network nodes in the path, e.g., the network nodes 304b-c in the normal traffic flow 312 of the traffic that the flagged traffic or packets are to be subjected for capture and forwarding (e.g., an encapsulated and truncated copy of the packet headers to the analytics platform 308) when the flagged packets transit these subsequent network nodes 304b-c.

This use of a flag in the transported traffic stream avoids a need to distribute and implement a complex traffic match on each subsequent "mid-span" or intermediate capture-enabled network node such as the network nodes 304b-c. Thus, the detailed policies for matching or selection criteria need not be distributed to all nodes of the network 300, but only the first network node such as the network node 304a may be configured to implement the matching logic for the selection criteria. The subsequent network nodes 304b-c may identify packets as having been selected for monitoring based on the presence of the flag on the transported traffic arriving in to these subsequent network nodes 304b-c, in order to trigger the desired functionality for monitoring the packets. In this way, the configuration of these subsequent or intermediate network nodes 304b-c may be simplified to include, for example, a match-on-flag function which may trigger the packet truncation, ERSPAN-encapsulation with timestamps, etc., and functionality for forwarding to the analytics platform 308.

Additionally, the use of the flag in exemplary aspects also promotes scalability and stability of the intermediate network nodes 304b-c for example. Since the intermediate network nodes 304b-c need not to be configured to perform checks for various rules, such as using Ternary Content Addressable Memory (TCAM) loads associated with carrying multiple different traffic matches created by downstream network sources for the flagged traffic streams. The intermediate network nodes 304b-c can similarly be excluded from implementing TCAM churn as the related policies are changed by the network administrator. Rather, these intermediate network nodes 304b-c may be configured with match-on-flag criteria to trigger their traffic capture capability, with the actual flags on the traffic of interest being generated and/or altered at the edge of the network 300 at the first network node 304a, for example. In this manner, the intermediate network nodes 304b-c (typically used for aggregation, core switching, and routing platforms) more stable and less subject to the CPU loading and hardware programming churn associated with constantly varying designations of traffic of interest.

Some example implementations of the flags will now be discussed. In the fabric of the network 300, e.g., in a network environment using a network overlay such as VXLAN (virtual extensible LAN), a bit within the overlay (e.g., VXLAN) packet header may be used as a flag for designating the traffic of interest. Reserved bits in the overlay (e.g., VXLAN) header may also be used for the flag, or alternatively in another format such as a VXLAN-GPE format, an operations, administration, and maintenance (OAM) bit may be used for the flag. Any subsequent network node such as the intermediate network nodes 304b-c which receive a packet with the flag bit set in the overlay (e.g., VXLAN) header may trigger the desired functionality for traffic monitoring in such implementations.

In an IPv6 network, a bit in a flow label (which is typically under-utilized or unused in IPV6) may be used as the flag indicator. Alternatively, a different bit in the IPv6 header may be used as the flag.

In a traditional IPv4 network, non-encapsulated traffic, when no overlay-based (e.g., VXLAN-based) or similar fabric is present, and IPv4 is in use, a most significant bit (MSB) of a two-byte fragmentation field in the IPv4 header may be used as the flag. This MSB is currently an unused bit in the IPv4 header (while the other bits in this 16-bit fragmentation field in IPv4 are used as follows—13 bits for fragment offset, 1 bit for Don't-Fragment flag, and 1 bit for More-Fragments flag, with the MSB unused). If the MSB of the fragmentation field is used for the flag, to avoid spoofing of this MSB by malicious hosts, the MSB may be cleared on the first-hop ingress node such as the network node 304a for all packets except for those which have been designated as traffic of interest which may be flagged using the MSB. Further, to retain compatibility and compliance with Internet protocols such as RFC 791, the MSB may be cleared when traffic leaves the area of the network where the traffic capture functionality is desired, or when transiting out to the Internet or other partner networks.

If in any implementation of the above aspects wherein any network node in the transit traffic path, an undesirable clearing of the MSB of the fragmentation field in the IPv4 header is encountered, or where setting this MSB leads to undesirable network effects at a network node, the MSB may be cleared, and the original matching criteria (as designated previously) may be implemented instead on the subsequent network node on which the undesirable effects were encountered. This way, the matching criteria may be selectively implemented on specific intermediate network nodes in these situations, without requiring the full traffic-matching criteria to be implemented on every transit traffic network node.

Accordingly, aspects of this disclosure may be implemented at a platform level in ASIC-based hardware at the various network nodes of the network fabric being monitored, such as the Unified Access Data Plane (UADP) ASIC, which can provide related assurance capabilities. In addition, since the functionality for detecting packets to be monitored and providing the encapsulated portions thereof for analysis is implemented entirely in hardware, no additional processing load is introduced on the network node device platforms. By providing a hardware-based solution, using an enhancement to the ERSPANv3 functionality in switches and routers which may constitute the network nodes, improved scalability may be achieved and the impact on network devices for implementing the exemplary functionality (e.g., to local device CPU resources) is reduced or eliminated.

Absorbing ERSPAN-based data from the network nodes, and analyzing this data to provide the Assurance results, e.g., in the analytics platform 308, may be implemented in by various elements of the network. For example, the analytics platform 308 may be implemented by Virtual Network Analysis Module (vNAM) and Cisco DNA center. The vNAM functionality, for example, may be hosted as a containerized application on network devices (such as the Catalyst 9000 series switches or IOS-XE-based routers), allowing latent compute resources in these platforms to be leveraged for assurance in a distributed manner, which allows the solution to scale.

Accordingly, aspects of this disclosure enable network monitoring capabilities for a network manager for selected data flows as they move across an Enterprise network, for example. Correspondingly, hop-by-hop data on latency, jitter, and packet loss may be observed with high accuracy, as well as determining accurate Proof of Transit on the network paths involved. In addition, offline analysis of the truncated copies of the packet headers captured form the network nodes may enable a complete L4-L7 traffic analysis, thus providing the network managers with information for determining, for example, application performance, TCP retransmissions, and other network pathologies.

Figure 5:
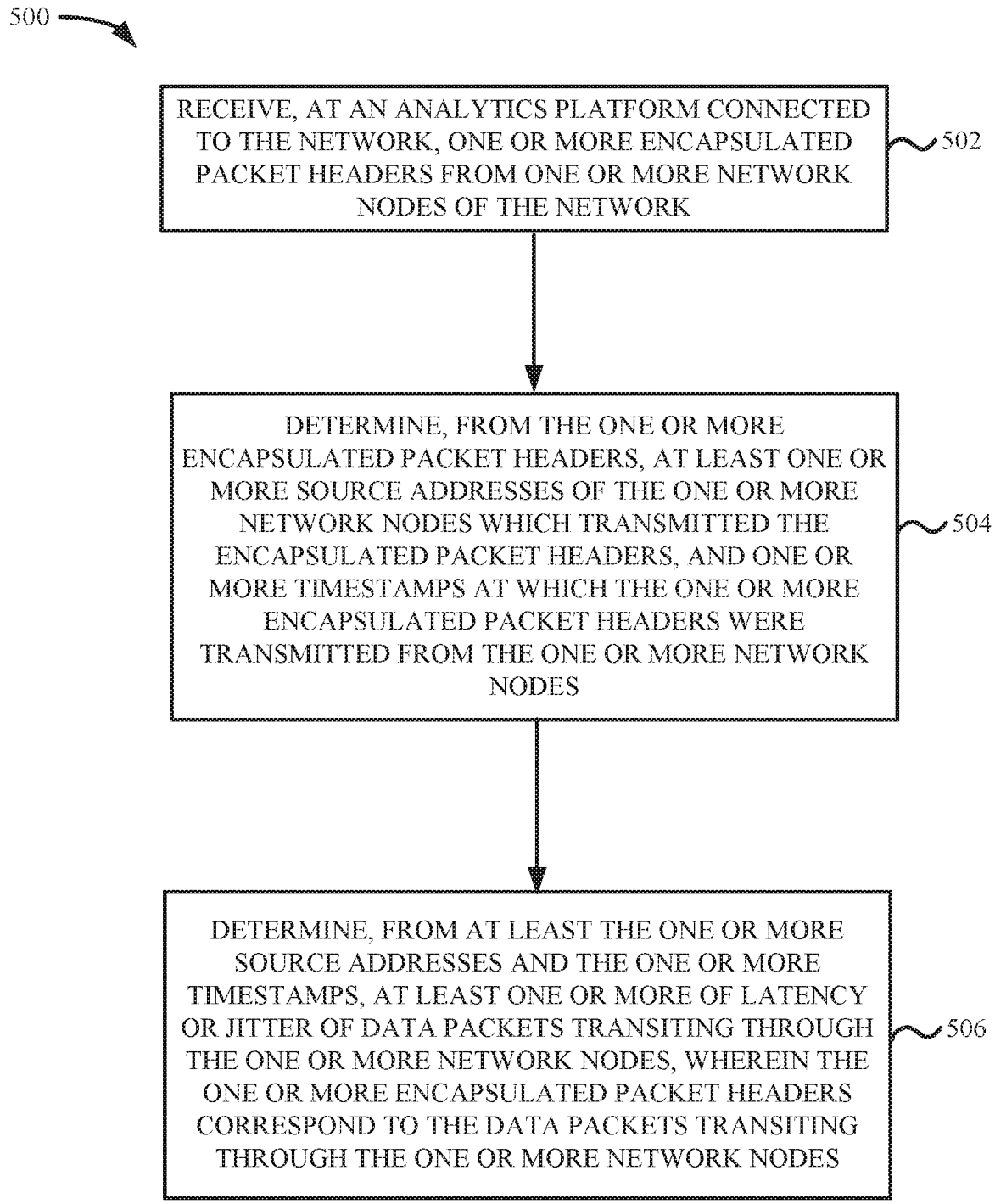
FIG. 5 illustrates an example method for monitoring network traffic in accordance with some examples.

Having described example systems and concepts, the disclosure now turns to the method 500 illustrated in FIG. 5. The steps outlined herein are examples and can be implemented in any combination thereof, including combinations that exclude, add, or modify certain steps.

At the step 502, the method 500 can involve receiving, at an analytics platform (e.g., 308) connected to a network (e.g., 300), one or more encapsulated packet headers (e.g., 310a-c) from one or more network nodes (304a-c) of the network. The one or more encapsulated packet headers received from the one or more network nodes may be based on one or more selection criteria or the triggers provided to the one or more network nodes, wherein the encapsulated packet headers are generated by the one or more network nodes for the data packets transiting the one or more network nodes and matching the selection criteria. The one or more selection criteria may correspond to a granularity of the network traffic to be monitored.

At the step 504, the method 500 can involve determining, from the one or more encapsulated packet headers, at least one or more source addresses (e.g., IP addresses) of the one or more network nodes which transmitted the encapsulated packet headers, and one or more timestamps (e.g., 402a) at which the one or more encapsulated packet headers were transmitted from the one or more network nodes. Each encapsulated packet header of the one or more encapsulated packet headers may comprise a truncated copy of a header of a data packet transiting through a corresponding network node of the one or more network nodes, e.g., in the ERSPANv3 packet header 400 shown in FIG. 4.

At the step 506, the method 500 can involve determining, from at least the one or more source addresses and the one or more timestamps, at least one or more of latency or jitter of data packets transiting through the one or more network nodes, wherein the one or more encapsulated packet headers correspond to the data packets transiting through the one or more network nodes (e.g., as part of the normal traffic flow 312). The analytics platform 308 may further determine one or more sequence numbers from each of the one or more encapsulated packet headers for determining one or more of a loss in the data packets or the one or more encapsulated packet headers, based on the one or more sequence numbers. For instance, the one or more sequence numbers may comprise at least a first sequence number introduced by the first network node, wherein the first network node is an ingress node of the network through which the data packets enter the network from an endpoint external to the network. The first sequence number may be incremented at each successive network node (e.g., 304b-c) of the one or more network nodes through which the data packets transit. The one or more sequence numbers may additionally, and optionally, comprise a second sequence number which is a constant at all the network nodes, or in other words, is invariant between the first network node and the one or more network nodes through which the data packets transit.

In some aspects, in addition to the selection criteria, a flag may be optionally utilized for data packets or traffic of interest, wherein the one or more encapsulated packet headers received from a first network node of the one or more network nodes may be based on one or more selection criteria provided to the first network node and the flag inserted by the first network node. The encapsulated packet headers are generated by the first network nodes for the data packets transiting the first network node and matching the selection criteria and the flag. In these aspects, the one or more encapsulated packet headers received from the one or more intermediate network nodes other than the first network node may be based on data packets transiting the one or more intermediate network nodes and matching the flag.

Figure 6:
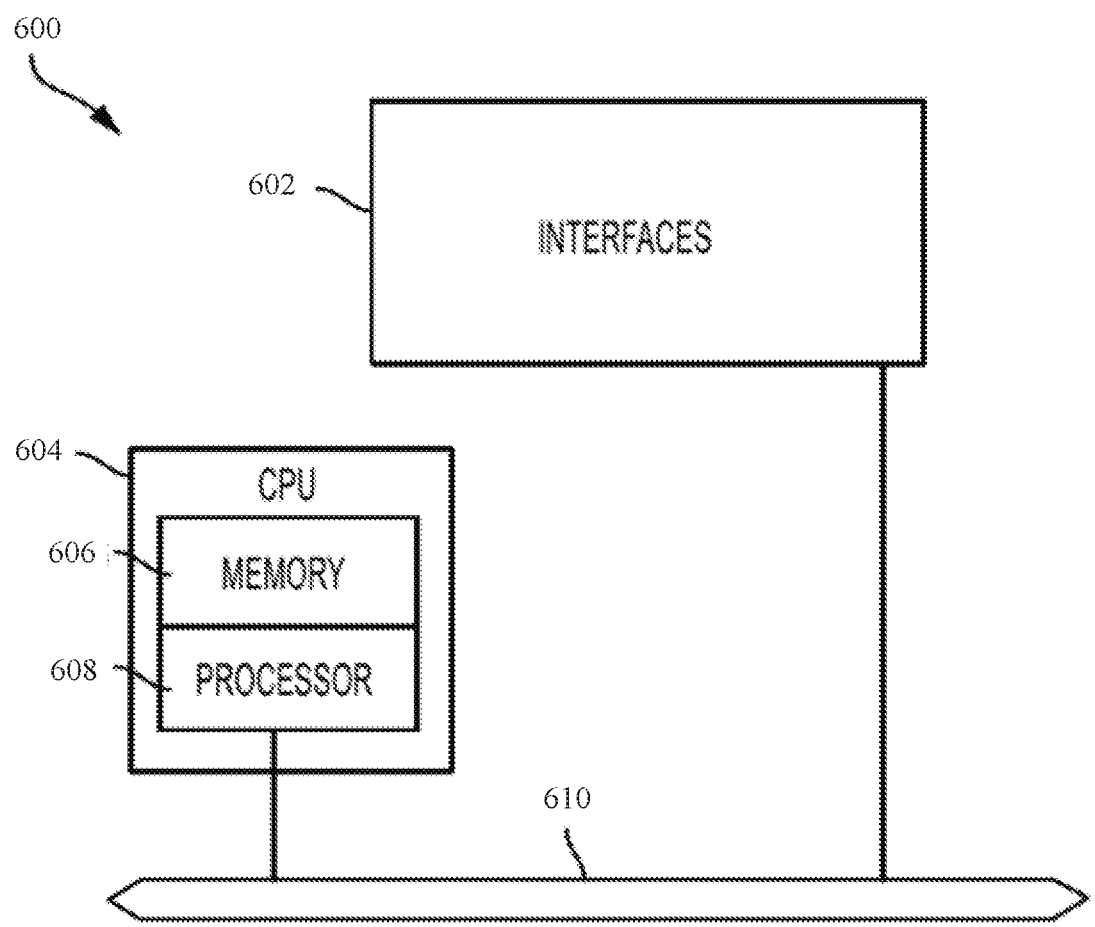
FIG. 6 illustrates an example network device in accordance with various examples.

FIG. 6 illustrates an example network device 600 (e.g., implementations of the network nodes 304a-c discussed above) suitable for implementing policy agents and performing switching, routing, and other networking operations related to selecting data packets based on trigger conditions and forming encapsulated and truncated copies of packet headers thereof for monitoring the network traffic according to this disclosure. Network device 600 includes a central processing unit (CPU) 604, interfaces 602, and a connection 610 (e.g., a PCI bus). When acting under the control of appropriate software or firmware, the CPU 604 is responsible for executing packet management, error detection, and/or routing functions. The CPU 604 preferably accomplishes all these functions under the control of software including an operating system and any appropriate applications software. CPU 604 may include one or more processors 608, such as a processor from the INTEL X86 family of microprocessors. In some cases, processor 608 can be specially designed hardware for controlling the operations of network device 600. In some cases, a memory 606 (e.g., non-volatile RAM, ROM, etc.) also forms part of CPU 604. However, there are many different ways in which memory could be coupled to the system.

The interfaces 602 are typically provided as modular interface cards (sometimes referred to as "line cards"). Generally, they control the sending and receiving of data packets over the network and sometimes support other peripherals used with the network device 600. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master microprocessor 604 to efficiently perform routing computations, network diagnostics, security functions, etc.

Although the system shown in FIG. 6 is one specific network device of the present technologies, it is by no means the only network device architecture on which the present technologies can be implemented. For example, an architecture having a single processor that handles communications as well as routing computations, etc., is often used. Further, other types of interfaces and media could also be used with the network device 600.

Regardless of the network device's configuration, it may employ one or more memories or memory modules (including memory 606) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. The memory 606 could also hold various software containers and virtualized execution environments and data.

The network device 600 can also include an application-specific integrated circuit (ASIC), which can be configured to perform routing and/or switching operations. The ASIC can communicate with other components in the network device 600 via the connection 610, to exchange data and signals and coordinate various types of operations by the network device 600, such as routing, switching, and/or data storage operations, for example.

Figure 7:
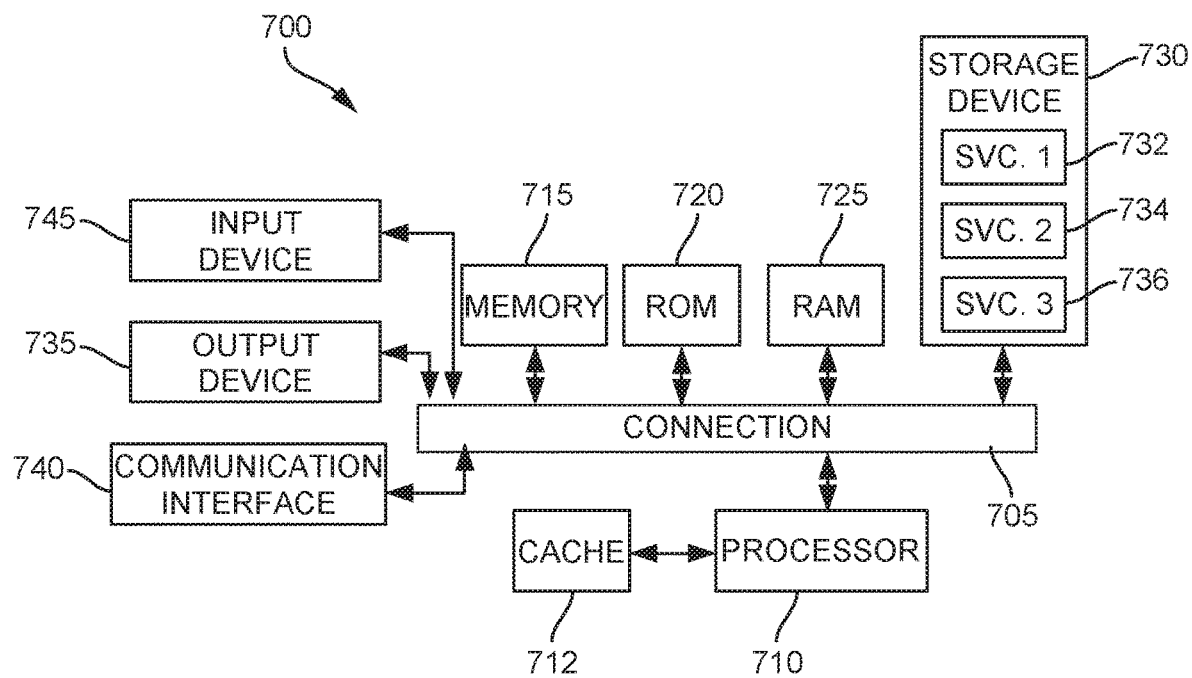
FIG. 7 illustrates an example computing device architecture, in accordance with some examples.

FIG. 7 illustrates an example computing device architecture 700 of an example computing device which can implement the various techniques described herein. The components of the computing device architecture 700 are shown in electrical communication with each other using a connection 705, such as a bus. The example computing device architecture 700 includes a processing unit (CPU or processor) 710 and a computing device connection 705 that couples various computing device components including the computing device memory 715, such as read only memory (ROM) 720 and random access memory (RAM) 725, to the processor 710.

The computing device architecture 700 can include a cache of high-speed memory connected directly with, in close proximity to, or integrated as part of the processor 710. The computing device architecture 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other computing device memory 715 may be available for use as well. The memory 715 can include multiple different types of memory with different performance characteristics. The processor 710 can include any general purpose processor and a hardware or software service, such as service 1 732, service 2 734, and service 3 736 stored in storage device 730, configured to control the processor 710 as well as a special-purpose processor where software instructions are incorporated into the processor design. The processor 710 may be a self-contained system, containing multiple cores or processors, a bus, memory controller, cache, etc. A multi-core processor may be symmetric or asymmetric.

To enable user interaction with the computing device architecture 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art, such as a display, projector, television, speaker device, etc. In some instances, multimodal computing devices can enable a user to provide multiple types of input to communicate with the computing device architecture 700. The communications interface 740 can generally govern and manage the user input and computing device output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof. The storage device 730 can include services 732, 734, 736 for controlling the processor 710. Other hardware or software modules are contemplated. The storage device 730 can be connected to the computing device connection 705. In one aspect, a hardware module that performs a particular function can include the software component stored in a computer-readable medium in connection with the necessary hardware components, such as the processor 710, connection 705, output device 735, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. A method comprising:
   receiving, at an analytics platform connected to a network, one or more encapsulated packet headers from one or more network nodes of the network, wherein the one or more encapsulated packet headers correspond to a subset of data packets from a plurality of data packets transiting through the one or more network nodes and having header information that matches a selection criteria, and wherein the subset of data packets are received from the one or more network nodes based on a granularity criteria defining a ratio of data packets having header information that matches the selection criteria to include in the subset of data packets;
   determining, from the one or more encapsulated packet headers, at least one or more source addresses of the one or more network nodes which transmitted the encapsulated packet headers, and one or more timestamps at which the one or more encapsulated packet headers were transmitted from the one or more network nodes; and
   determining, from at least the one or more source addresses and the one or more timestamps, at least one or more of latency or jitter of data packets transiting through the one or more network nodes.

2. The method of claim 1, further comprising:
   determining one or more sequence numbers from each of the one or more encapsulated packet headers; and
   determining one or more of a loss in the data packets or the one or more encapsulated packet headers, based on the one or more sequence numbers.

3. The method of claim 2, wherein the one or more sequence numbers comprise at least a first sequence number introduced by a first network node of the one or more network nodes, the first sequence number incremented at each successive network node of the one or more network nodes through which the data packets transit.

4. The method of claim 3, wherein the first network node is an ingress node of the network through which the data packets enter the network from an endpoint external to the network.

5. The method of claim 3, wherein the one or more sequence numbers further comprise a second sequence number, wherein the second sequence number is invariant between the first network node and the successive network nodes of the one or more network nodes through which the data packets transit.

6. The method of claim 1, wherein each encapsulated packet header of the one or more encapsulated packet headers comprises a truncated copy of a header of a data packet transiting through a corresponding network node of the one or more network nodes.

7. The method of claim 1, wherein the encapsulated packet headers are generated by the one or more network nodes for the plurality of data packets transiting the one or more network nodes and matching the selection criteria.

8. The method of claim 1, wherein the plurality of data packets matching the selection criteria are identified based on a flag inserted by a network node from the one or more network nodes.

9. The method of claim 1, wherein the one or more encapsulated packet headers are received from a first network node of the one or more network nodes based on one or more selection criteria provided to the first network node and a flag inserted by the first network node, wherein the encapsulated packet headers are generated by the first network node for the data packets transiting the first network node and matching the selection criteria.

10. The method of claim 9, wherein the one or more encapsulated packet headers are received from one or more intermediate network nodes other than the first network node based on data packets transiting the one or more intermediate network nodes and matching the flag.

11. A system, comprising:
    one or more processors; and
    a non-transitory computer-readable storage medium containing instructions which, when executed on the one or more processors, cause the one or more processors to perform operations including:
    receiving one or more encapsulated packet headers from one or more network nodes of the network, wherein the one or more encapsulated packet headers correspond to a subset of data packets from a plurality of data packets transiting through the one or more network nodes and having header information that matches a selection criteria, and wherein the subset of data packets are received from the one or more network nodes based on a granularity criteria defining a ratio of data packets having header information that matches the selection criteria to include in the subset of data packets;
    determining, from the one or more encapsulated packet headers, at least one or more source addresses of the one or more network nodes which transmitted the encapsulated packet headers, and one or more timestamps at which the one or more encapsulated packet headers were transmitted from the one or more network nodes; and
    determining, from at least the one or more source addresses and the one or more timestamps, at least one or more of latency or jitter of data packets transiting through the one or more network nodes.

12. The system of claim 11, wherein the operations further comprise:
    determining one or more sequence numbers from each of the one or more encapsulated packet headers; and
    determining one or more of a loss in the data packets or the one or more encapsulated packet headers, based on the one or more sequence numbers.

13. The system of claim 12, wherein the one or more sequence numbers comprise at least a first sequence number introduced by a first network node of the one or more network nodes, the first sequence number incremented at each successive network node of the one or more network nodes through which the data packets transit.

14. The system of claim 13, wherein the first network node is an ingress node of the network through which the data packets enter the network from an endpoint external to the network.

15. The system of claim 13, wherein the one or more sequence numbers further comprise a second sequence number, wherein the second sequence number is invariant between the first network node and the successive network nodes of the one or more network nodes through which the data packets transit.

16. The system of claim 11, wherein each encapsulated packet header of the one or more encapsulated packet headers comprises a truncated copy of a header of a data packet transiting through a corresponding network node of the one or more network nodes.

17. The system of claim 11, wherein the encapsulated packet headers are generated by the one or more network nodes for the data packets transiting the one or more network nodes and matching the selection criteria.

18. The system of claim 11, wherein the one or more encapsulated packet headers are received from a first network node of the one or more network nodes based on one or more selection criteria provided to the first network node and a flag inserted by the first network node, wherein the encapsulated packet headers are generated by the first network node for the data packets transiting the first network node and matching the selection criteria.

19. The system of claim 18, wherein the one or more encapsulated packet headers are received from one or more intermediate network nodes other than the first network node based on data packets transiting the one or more intermediate network nodes and matching the flag.

20. A non-transitory machine-readable storage medium, including instructions configured to cause a data processing apparatus to perform operations including:
receiving one or more encapsulated packet headers from one or more network nodes of the network, wherein the one or more encapsulated packet headers correspond to a subset of data packets from a plurality of data packets transiting through the one or more network nodes and having header information that matches a selection criteria, and wherein the subset of data packets are received from the one or more network nodes based on a granularity criteria defining a ratio of data packets having header information that matches the selection criteria to include in the subset of data packets;
determining, from the one or more encapsulated packet headers, at least one or more source addresses of the one or more network nodes which transmitted the encapsulated packet headers, and one or more timestamps at which the one or more encapsulated packet headers were transmitted from the one or more network nodes; and
determining, from at least the one or more source addresses and the one or more timestamps, at least one or more of latency or jitter of data packets transiting through the one or more network nodes.

\* \* \* \* \*